July 31, 1934.                M. H. KLIEFOTH                1,968,456
              GASEOUS PRESSURE WAVE ABSORBING CONSTRUCTION
                          Filed July 28, 1932
Fig.1.          Fig.2.          Fig.3.          Fig.4.
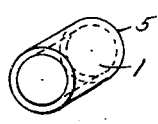 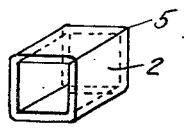 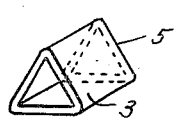 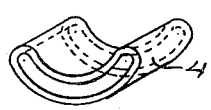
Fig.5.          Fig.6.          Fig.8.          Fig.9.
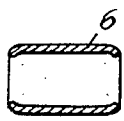 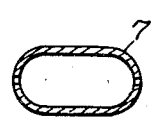 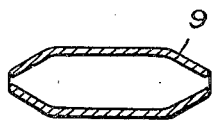 
Fig.7.          Fig.11.         Fig.10.         Fig.12.
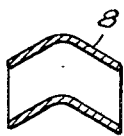 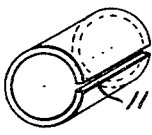 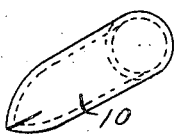 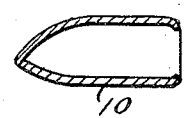
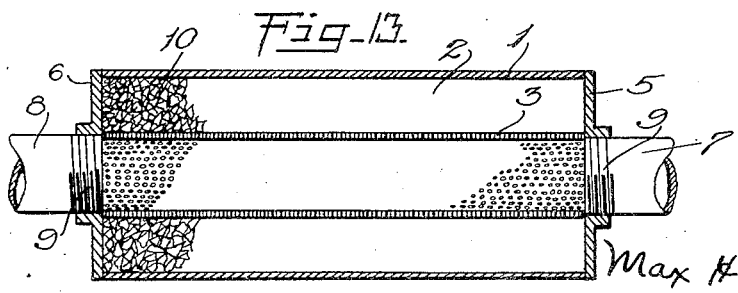
INVENTOR
Max H. Kliefoth
BY
Pennie, Davis, Marvin & Edmonds
ATTORNEYS Patented July 31, 1934

1,968,456

UNITED STATES PATENT OFFICE 1,968,456

GASEOUS PRESSURE WAVE ABSORBING CONSTRUCTION

Max H. Kliefoth, Madison, Wis., assignor to C. F. Burgess Laboratories, Inc., Madison, Wis., a corporation of Delaware Application July 28, 1932, Serial No. 625,558

20 Claims. (Cl. 181—0.5)

This invention relates to an improved absorber for gaseous pressure-waves such as those that are produced by sound and by gas engine exhausts. It is adapted to be used especially in constructions where the absorber is subject to excessive vibration and gas impact such as in exhaust mufflers, although it may be used in other situations. It is an improvement over the loose packed sound and gas pressure wave absorbing materials disclosed in the Schnell Patent No. 1,811,762. It also may be used as a sound absorber and it may be faced with a foraminous material such as the perforated stiff membrane of the Norris Patent No. 1,726,500, or other materials used in the acoustic art.

It is an object of this invention to provide an efficient sound absorbing and gas pressure-wave absorbing material that is cheap to make, is easy to handle, may be made light in weight, and does not deteriorate rapidly, especially when used in gas engine mufflers. It may be made of a variety of materials to suit the conditions of use.

The accompanying drawing illustrates various forms of aggregates which may be employed in the production of the absorber. In the drawing, Fig. 1 is a perspective view of a short tube or bead;

Fig. 2 is a similar view of an aggregate of square cross section;

Fig. 3 is a similar view of an aggregate of triangular cross section;

Fig. 4 is a similar view of an aggregate in the form of a flattened tube;

Fig. 5 is a sectional view of a tubular aggregate having the ends partially closed;

Fig. 6 is a similar view of an aggregate having its ends rounded to a greater extent than Fig. 5 and nearly closed;

Fig. 7 is a longitudinal, sectional view of a tubular aggregate which is bent or curved;

Fig. 8 is a similar view of an aggregate in which the ends are forced together forming narrow slits;

Fig. 9 is an end view thereof;

Fig. 10 is a perspective view of an aggregate having one end closed;

Fig. 11 is a perspective view of a tubular aggregate which is split longitudinally;

Fig. 12 is a sectional view of the aggregate shown in Fig. 10; and

Fig. 13 is a sectional view of an exhaust silencer diagrammatically showing the material of the present invention employed therein as a gaseous pressure wave absorbing material.

I have found that short tubes or beads 1, such as hollow cylinders of small diameter (Fig. 1), are especially suited to absorb gaseous pressure-waves when packed in a heterogeneous manner. Furthermore, the tubes packed in this manner form an absorber that is light in weight since the material is distributed to form a maximum of openings or cells with a minimum of wall weight. The tubes or beads which may be of uniform or varying size, may be packed loosely in a heterogeneous manner in combination with a suitable retaining facing, such as a screen or the perforated stiff material of the Norris Patent No. 1,726,500, when used for absorbing sounds, or it may be used in the mufflers of the Schnell Patent No. 1,811,762. Its use is not limited to such specific constructions. The tubes or beads may be cemented together to form a porous unit or tile. For exhaust mufflers they preferably are a ceramic or non-combustible material, such as a hardened or baked clay. Such ceramic tubes or beads also are desirable for sound absorption constructions and in intake silencers for compressors and gas engines. For these purposes, however, they may be made of inflammable materials, such as rubber, paper, pulp or other fibrous materials. Under certain conditions I may use metallic tubes, especially light weight tubes made of magnesium and aluminum, or their alloys. The tubes may have a cross-section which is other than cylindrical. They may be square, as the tube 2 (Fig. 2), triangular, as the tube 3 (Fig. 3), or any other shape, as for example the flattened tube 4 (Fig. 4). Such square or triangular tubes preferably should have rounded corners to prevent chipping and abrasion losses.

I have found that short tubes, such as hollow cylinders of small diameter, are especially suited to resist the destructive mechanical action encountered especially in internal combustion engine mufflers. Furthermore, such tubes or beads constitute a gas-pressure absorbing and sound absorbing material especially suitable for use in the Schnell device since they also may be made of suitable cheap light materials which resist the highly destructive action to which they are subjected. These tubes may be packed loosely in a heterogeneous manner in a suitable casing or they may be cemented together to form a porous unit. They are preferably a ceramic material such as a hardened or baked clay.

The sized particles of blown slag, bloated clay, Haydite, and the like, which have been used heretofore, have comparatively rough surfaces which are abrasive enough to wear each other away rapidly when subjected to the excessive vibrations and violent movement under the conditions of use in a muffler of the Schnell type, or in constructions where the gases pass through the absorber. Although short solid rods of abrasion-resisting material may be used in my construction, I prefer to use the more efficient short, hollow, cylindrical tubes or beads of small diameter having hard smooth outside surfaces. When they are packed into a muffler and subjected to the conditions of use, they abrade comparatively slowly.

I have found that I may make ceramic tubes, particularly adapted for use as a gas-pressure absorbing and sound absorbing material in internal combustion engine mufflers, from a variety of ceramic mixes. These may be made by extruding in the usual way any plastic clay into tubes, cutting the tubes to length, and firing or hardening them in a kiln. Other ceramic materials or mixes may be used. Porcelain tubes may be used. Glass tubes may also be used under certain conditions. I prefer to use a plastic mixture comprising fire clay tempered with a caustic alkali solution. This clay may be made of lighter weight by incorporating kieselguhr or diatomaceous earth with it. As a specific example the plastic mixture may contain, exclusive of water, 46% to 49% of fire clay, 46% to 49% of kieselguhr, and 2% to 8% of caustic soda. The kieselguhr may be omitted from the mixture and additional clay substituted for it, to thereby increase the weight of the resulting tubes. After extruding the tubes and cutting them into short pieces the product is fired and hardened at a temperature substantially below 500° C. and preferably between 250° C. and 400° C. The firing temperature may be as low as 100° C. The kieselguhr mixture requires a somewhat higher temperature than that of the clay and caustic alkali alone. Higher temperatures ranging up to the fusion point of the mixture may be used, but the product resulting from the use of these higher temperatures does not have any advantages over that produced by firing at the low temperatures given. The mixture of clay and caustic alkali fired at the indicated low temperatures is very hard. Certain molded clays indurated with caustic alkali become very water-resistant, that is, they do not disintegrate when subjected to the action of boiling water for a prolonged period of time. The amount of caustic alkali and the firing temperature are determined by the type of clay or clay-like material, which includes bauxitic minerals, that is used. Certain fire clays may be hardened by caustic alkalis to a porcelain-like consistency at 100° C., or temperatures somewhat above 100° C. This method of indurating clays and clay-like materials at low temperatures with caustic alkalis is described and claimed in my copending application Serial No. 625,525 filed July 28, 1932. The tubes produced by the method described are hard, smooth, strong, water-resistant and withstand the abrasion-producing action of exhaust mufflers when in use. Those containing a limited amount of kieselguhr are lighter in weight, and although not as hard and abrasion-resistant as those tubes in which the kieselguhr is not used, they may be abrasion-resistant enough to be used in mufflers. Although the surface of these tubes is hard and smooth, nevertheless it is not as smooth as that of glass or metal and it therefore has a slightly better sound absorbing characteristic. Such clay tubes therefore have this advantage over glass, metal and other similarly surfaced tubes or beads.

Tubes made from a plastic mass of clay and water alone must be fired at the fritting point of the clay or higher, if such tubes are to be of the same order of hardness and water resistance as those made of the clay-caustic alkali mixture fired at a temperature somewhat above the boiling point of water. The disadvantages of such high temperature operations are apparent to those skilled in the art.

Another suitable plastic mixture which may be of brick shale and kieselguhr tempered with caustic soda, sodium silicate and sodium silicofluoride. Following is a definite mixture which may be used: 42.5% brick shale, 42.5% kieselguhr, 5% to 10% sodium silicate, 1% to 3% sodium silicofluoride, and 2% to 8% of caustic soda, exclusive of water. The addition of a limited amount of an alkali silicate such as sodium silicate, to the tempering agent increases the strength and hardness of the tubes. When sodium silicate is added to the tempering agent, an anti-puffing agent, such as sodium silicofluoride, should also be added to prevent the mixture from puffing during the heating operation, if such puffing is undesirable. Various kinds of powdered mineral fillers may be mixed with alkali silicate and extruded into tubes or pressed into beads. The mixture of body material, tempering agent and water is thoroughly kneaded to form a plastic mass and is then extruded through dies having the desired dimensions to form tubes which are cut to the desired length as they emerge from the dies.

It is desirable in some cases, especially in the case of tubes of large diameter, to tumble the moist cut tubes in a suitable tumbling machine to round off or turn in the sharp edges of the tubes. This prevents the breaking off of these edges during use and decreases abrasion losses. Such tubes may have the appearance of hollow cylinders 6 with closed ends, (Fig. 5) beads or hollow spheres 7 with end openings (Fig. 6). The tubes do not necessarily have to be straight but may be bent or curved, as shown at 8 in Fig. 7. The ends of the tubes may be forced together so that the openings are narrow slits as shown at 9 in Figs. 8 and 9. During the cutting-off operation after extrusion one end may be completely closed as shown at 10 in Figs. 10 and 12. The formed tubes are then dried and hardened or fired.

The resulting tubes or beads are packed in back of a foraminous facing to form an exterior lining or backing of gaseous-pressure-wave absorbing material, which absorbs sounds and other gas-pressure waves. The hardened tubes may be bound together at their points of contact, if desired, by the use of a suitable binder, such as Portland cement or sodium silicate. In the case of the ceramic tubes, a pre-cast block tile or core may be made by packing and pressing the moist tubes into a desired form before drying, and then firing. Obviously the pressure should not be great enough to destroy the cellular structure. In forming a pre-cast block, tile or core of ceramic tubes, it is desirable to thoroughly wet the surface of the individual tubes, without causing the body of the tubes to become so wet that the walls soften and collapse. This wetting produces a satisfactory weld at points of contact and may be accomplished by passing steam through the packed core. The wetted block, tile or core is then dried and fired. A pre-cast unit also may be made by packing the moist tubes into a desired form and raising the temperature of the material to its fritting or fusion point during firing. It is possible to omit the perforated metal facing or other foraminous facing when such a molded or pre-cast unit is used. For mufflers the molded or cast gas-pressure absorbing and sound absorbing material has an opening therethrough corresponding to the foraminous tube.

The tubes may vary over a considerable range of sizes. For sound absorption work and for ordinary mufflers for automobile engines I prefer to use cylindrical tubes having an outside diameter of not more than approximately 1/8 inch, a wall thickness of approximately 0.015 inch and from 1/8 inch to 1/4 inch long. When a foraminous facing is used, the lower limit of sizes is governed by the size of the openings in the facing. In general it is desirable to keep the finished tubes under 1/2 inch in length, since the muffler absorption and also the sound absorption decreases as the length of the tubes increases. Tubes varying in length from 1/8 inch to 3/8 inch give excellent results. Those 1/8 inch tubes passing through a 6 mesh screen and remaining on an 8 mesh screen are approximately 1/8 inch long and therefore more nearly resemble narrow bands or collars. Although such short tubes give excellent gas-pressure absorbing and sound absorbing results, they are heavier per cubic foot than larger tubes. They are more fragile and break down sooner, especially in mufflers. The tubes 1/16 inch in diameter give better absorption results than those 1/8 inch in diameter. However, in the manufacturing difficulties are greatly increased with tubes of this size, since it is necessary to decrease the wall thickness proportionately or the weight per cubic foot is increased. Tubes having both a diameter and length of 1/2 inch may be used, but the sound absorption coefficient is lower than that of the smaller tubes. This lower coefficient is offset, however, by fewer difficulties in their manufacture and a lower cost of manufacture. Although it is desirable to have thin walls to decrease the weight of the tubes, ceramic tubes having a wall thickness less than about 0.015 inch become increasingly fragile, and furthermore, the extrusion of such thin walled tubes presents difficulties. It is desirable to increase the wall thickness of large diameter tubes over that used in tubes of small diameter to increase their strength.

Experiment has shown that muffling and sound absorption depend mainly upon the volume and distribution of the air spaces or voids within the absorber filling. Although the percentage of voids is greater for the larger tubes, the sound absorption factor is less than that of the smaller tubes for the same volume of material. Apparently, the greater the number of voids for the described material, within limits, the greater the sound absorption factor.

It is possible to produce ceramic tubes 1/8 inch in diameter of a clay and kieselguhr mixture hardened with caustic soda solution which weigh as low as 18 pounds per cubic foot when packed in heterogeneous arrangement. Such tubes give good service in automobile mufflers. Tubes of this material which weigh from 18 pounds to 30 pounds per cubic foot also give excellent service in mufflers and also are light enough in weight to be of commercial value in the automotive industry. However, tubes weighing less than 18 pounds per cubic foot, if strong and durable enough, are still more desirable. Such tubes may be made by making the walls porous. This is done most easily by incorporating a combustible material in the plastic mass prior to the extrusion operation. Sawdust or particles of peat may be used. The combustible material is burned out of the tube walls to make them porous. However, such porous walls may be fragile and a firing temperature sufficient to burn out the combustible material must be used. Porous walls also may be made at lower firing temperatures by volatilizing naphthalene anthracene or other materials volatilizing at low temperatures out of a mixture of these volatile materials with the plastic mass.

Tubes weighing about 30 pounds per cubic foot are less desirable because of their weight. Good absorbing results, however, have been obtained with short-length tubes or beads weighing up to 50 pounds per cubic foot. The weight of the tubes is dependent upon several factors: the clay or clay-like material or other ceramic material used, the porosity of the clays which may depend upon the proportion of gieselguhr or other porous filler mixed with the clay, the amount of water used to temper the clay, the amount of caustic soda added to the tempering water, the pressure used in extruding the clay, and the size and wall thickness of the tubes. Ceramic tubes weighing below 18 pounds per cubic foot which do not have sufficient strength and hardness to withstand the severe conditions encountered in an automobile exhaust muffler may, however, be used in mufflers where the service conditions are less severe, and for other types of silencers, and for sound absorbers.

The amount of voids under the ranges of size and weight of tubes as herein described varies considerably. A muffler or sound absorber consisting of packed tubes of fire clay hardened with about 5% of caustic soda and weighing 50 pounds per cubic foot as packed contains about 58% of voids. If such tubes weigh 18 pounds per cubic foot the absorber contains about 85% of voids and with tubes weighing 12 pounds per cubic foot the absorber contains about 93% of voids. An absorber packed with tubes made of the hereinbefore described clay-kieselguhr-caustic soda composition and weighing 12 pounds per cubic foot contains 85% of voids. If the tubes weigh 10 pounds per cubic foot the absorber contains 88% of voids, and if these tubes weigh 20 pounds per cubic foot the absorber contains 75% of voids. Tubes weighing from 18 pounds to 30 pounds per cubic foot contain from 78% to 62% of voids. The percent of voids does not include those voids in the particles of kieselguhr since these are sealed and are not available for gas-pressure absorbing and sound absorbing purposes.

Although this specification has been directed principally to short tubes and especially to open-end hollow cylinders of small diameter, nevertheless such cylinders and other tubes may have their ends partially or almost entirely closed. Such cylinders of a length comparable to their diameter and which have their ends nearly closed may resemble hollow spheres. The ends of the hollow cylinders or other tubes may be nearly closed by a tumbling operation as described previously, or the ends may be pinched together during the cutting-off operation as the plastic tube is being extruded from the tube-making die. These different forms as illustrated and described are included when a tube or tube-like form or bead is specified in the claims unless limited to some specific form.

Although the tubes heretofore described have an unbroken periphery, it is possible to use split tubes. Such split tubes are easily made from metal as by rolling a piece of sheet metal until the edges approach each other as shown at 11 in Fig. 11. Obviously it is unnecessary to weld or otherwise fasten these edges together. Split tubes also may be made of clay compositions. Such split or slitted tubes as well as tubes having holes, punctures or pores in their periphery, are within the scope of the claims whenever beads or tubes are referred to.

It is possible to use other gaseous pressure-wave absorbing materials, such as are described in the Schnell patent, in admixture with the tubes or beads. A mixture of such tubes and granular body materials such as particles of exfoliated vermiculite, Haydite, pumice, cork and the like may be used. It is possible also to use a mixture of the tubes or beads with a body material of fibrous absorbers such as asbestos, mineral wool, steel wool, etc. These mixtures also may be bound together to form a tile-like absorber.

Because of the low firing temperature necessary for some of the clay-caustic alkali mixtures it is possible to incorporate dyes, and especially certain types of organic dyes, in such mixtures to form veri-colored tubes or beads. The decorative value of such beads in the exposed surfaces of sound-absorbing tiles is apparent to those skilled in the art.

Where the tubes or beads of this invention do not have a sufficiently hard surface and are subject to violent movement as in mufflers, to thereby cause them to abrade rapidly, it is necessary to prevent such excessive abrasion. Such tubes or beads should not have sharp corners or protuberances. If the surfaces are glass-hard the abrasion is decreased greatly. Those tubes or beads, especially when made of a ceramic material which is not glass hard but porous, may be coated with an unctuous material such as soapstone, but preferably with a highly unctuous graphite. The surface also may be coated with a glass hard surface. Gaseous pressure-wave absorbing constructions in which the particles having rounded surfaces which are coated with an unctuous material to thereby decrease abrasion losses to a minimum are described and claimed in my copending application Serial No. 625,559, filed July 28, 1932.

The glass hard surface may be applied to the tubes or beads by means of borax, powdered glass, powdered vitreous enamel and the like. The tubes or beads thus coated are then fired to fuse the coating material to a glass-like coating. This method and product is described and claimed in my copending application Serial No. 625,560, filed July 28, 1932.

As shown in Fig. 13 any of the forms of material may be employed as the absorbing construction in silencers of various types. In this figure of the drawing I have illustrated an exhaust silencer of the type shown in the Schnell patent. The silencer comprises an outer end metal cylinder 1, which is welded or otherwise fastened at its ends to annular discs 5 and 6. An inner tube or duct 3 of foraminous rigid material, such as perforated metal, extends through the outer casing from end to end and communicates with openings in the ends of the casing. An inlet pipe 7 may be connected to one of these openings and outlet pipe 8 may be connected to the other opening. These pipes may be connected in any suitable manner, preferably by means of slip joints so that the pipes are free to move in the discs. In the drawing however I have illustrated threaded connections 9.

Between the inner cylinder 3 and the outer casing 1 the space 2 may be filled with the sound absorbing material heretofore described as indicated at 10. In the drawing, for the purpose of illustration, the size of the individual aggregates has been exaggerated. The aggregates may be of any of the forms shown in Figs. 1 to 12 and may consist of a mixture of such forms. They may be bound together at their points of contact by means of a suitable binder as heretofore described or may be formed into a pre-cast block or core of the proper shape to be received in the space 2. When the latter construction is employed, the inner foraminous cylinder 3 may be omitted.

I claim:

1. A gaseous pressure-wave absorbing construction comprising heterogeneously packed, short-length tubes.

2. A gaseous pressure-wave absorbing construction comprising heterogeneously packed, ceramic, short-length tubes.

3. A gaseous pressure-wave absorbing construction comprising heterogeneously packed, cylindrical, short-length tubes.

4. A gaseous pressure-wave absorbing construction comprising heterogeneously packed, short-length tubes, at least some of said tubes being bound together at their points of contact.

5. A gaseous pressure-wave absorbing construction comprising heterogeneously packed, ceramic, short-length tubes bound together at their points of contact.

6. A gaseous pressure-wave absorbing construction comprising heterogeneously packed, cylindrical, ceramic, short-length tubes having turned-in ends.

7. A gaseous pressure-wave absorbing construction comprising heterogeneously packed, ceramic, short-length tubes having porous walls.

8. A gaseous pressure-wave absorbing construction comprising heterogeneously packed, ceramic, short-length tubes weighing less than 50 pounds per cubic foot.

9. A gaseous pressure-wave absorbing construction comprising heterogeneously packed, cylindrical, ceramic, short-length tubes weighing less than 30 pounds per cubic foot.

10. A gaseous pressure-wave absorbing construction comprising heterogeneously packed, ceramic, short-length tubes having an outside diameter and length of less than ½ inch and weighing less than 50 pounds per cubic foot.

11. A gaseous pressure-wave absorbing construction comprising heterogeneously packed, cylindrical, ceramic, short-length tubes having an outside diameter not greater than ⅛ inch.

12. A gaseous pressure-wave absorbing construction comprising heterogeneously packed, cylindrical, ceramic, short-length tubes having an outside diameter of ⅛ inch, a wall thickness of substantially 0.015 inch and a length of from ⅛ inch to ⅜ inch.

13. A gaseous pressure-wave absorbing construction comprising heterogeneously packed, ceramic, short-length tubes of a clay-like material.

14. A gaseous pressure-wave absorbing construction comprising heterogeneously packed, ceramic, short-length tubes of a mixture of clay-like material and kieselguhr and weighing less than 30 pounds per cubic foot.

15. A gaseous pressure-wave absorbing construction comprising heterogeneously packed, short-length tubes having more than 58% of voids.

16. A gaseous pressure-wave absorbing construction comprising heterogeneously packed, ceramic, short-length tubes of clay-like material indurated with caustic alkali.

17. A gaseous pressure-wave absorbing construction comprising heterogeneously packed, hardened, ceramic, cylindrical, short-length tubes of a mixture of clay-like material and kieselguhr indurated with caustic alkali.

18. A gaseous pressure-wave absorbing construction comprising heterogeneously packed, indurated, ceramic, short-length tubes having a wall thickness of about 0.015 inch.

19. A gaseous pressure-wave absorbing construction comprising heterogeneously packed, ceramic, short-length tubes having a smooth abrasion-resisting exterior surface and comprising fire clay indurated with caustic soda.

20. A gaseous pressure-wave absorbing construction comprising heterogeneously packed, ceramic, thin walled short-length tubes forming a coherent mass with interstices or channels therebetween and communicating with a face thereof.

MAX H. KLIEFOTH.